May 30, 1939.　　　W. F. HELMOND　　　2,160,251
TYPEWRITING MACHINE
Filed March 17, 1937　　　6 Sheets-Sheet 1
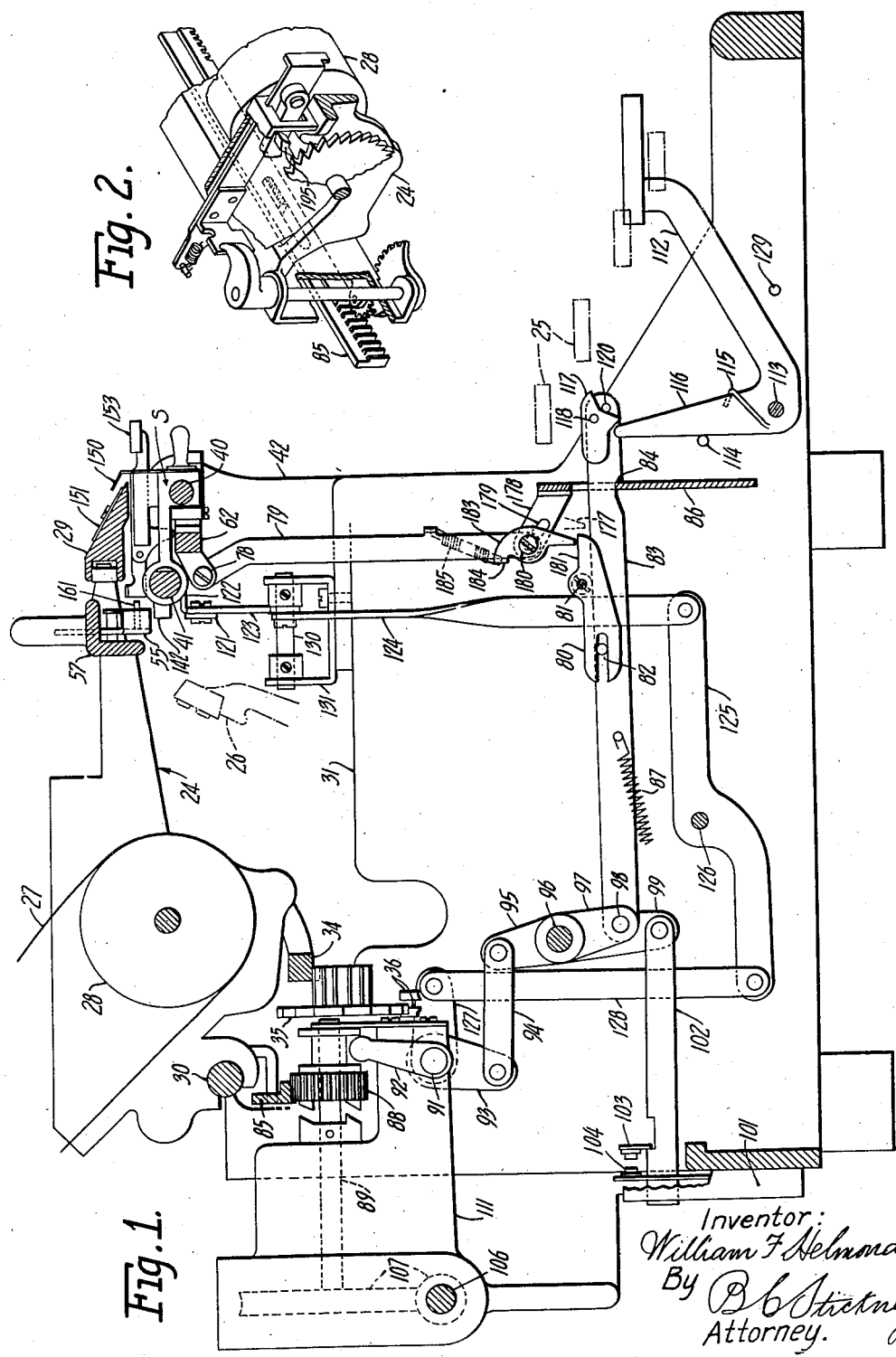

May 30, 1939. W. F. HELMOND 2,160,251
TYPEWRITING MACHINE
Filed March 17, 1937 6 Sheets-Sheet 2
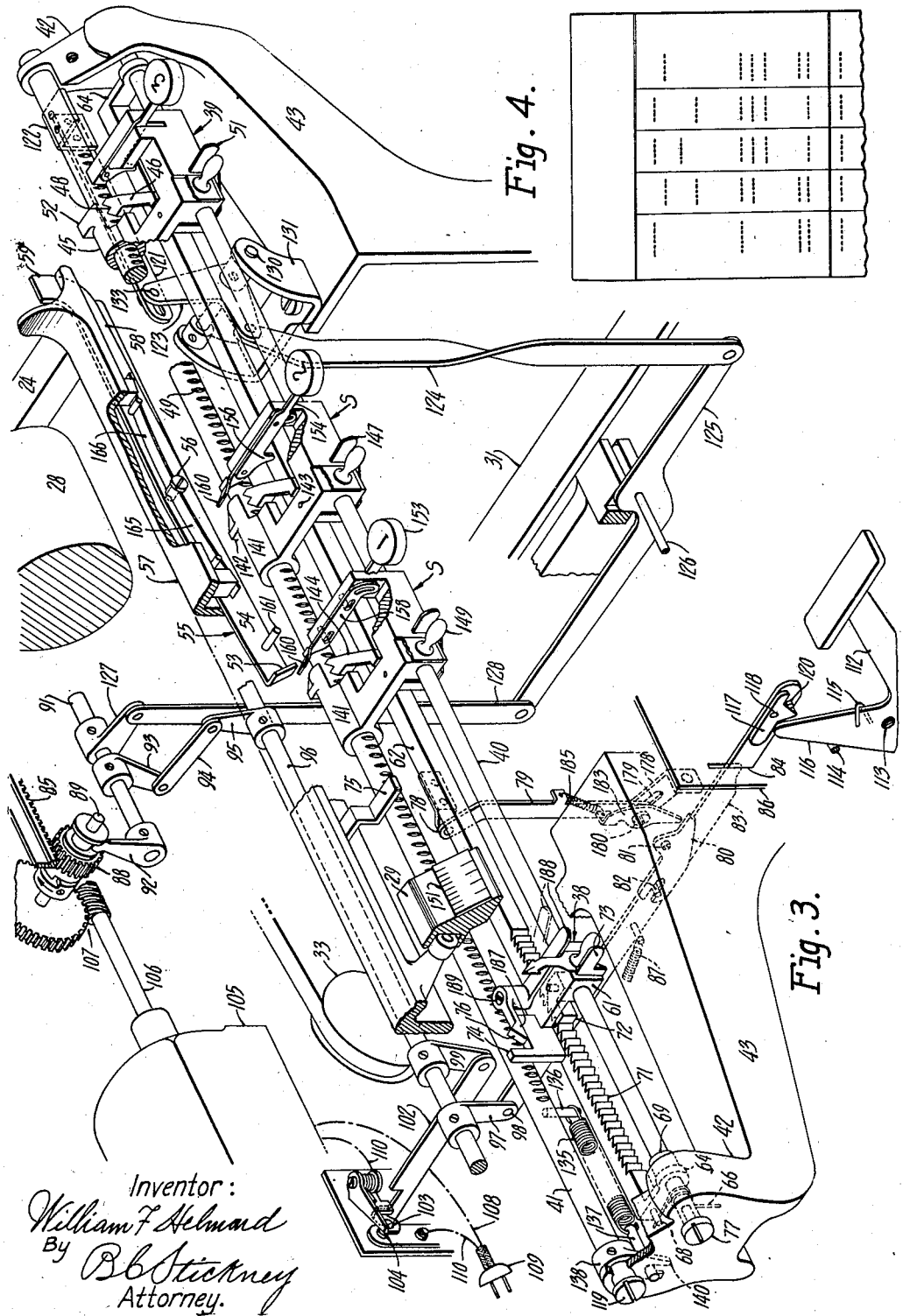
Inventor:
William F. Helmond
By B. C. Stickney
Attorney.

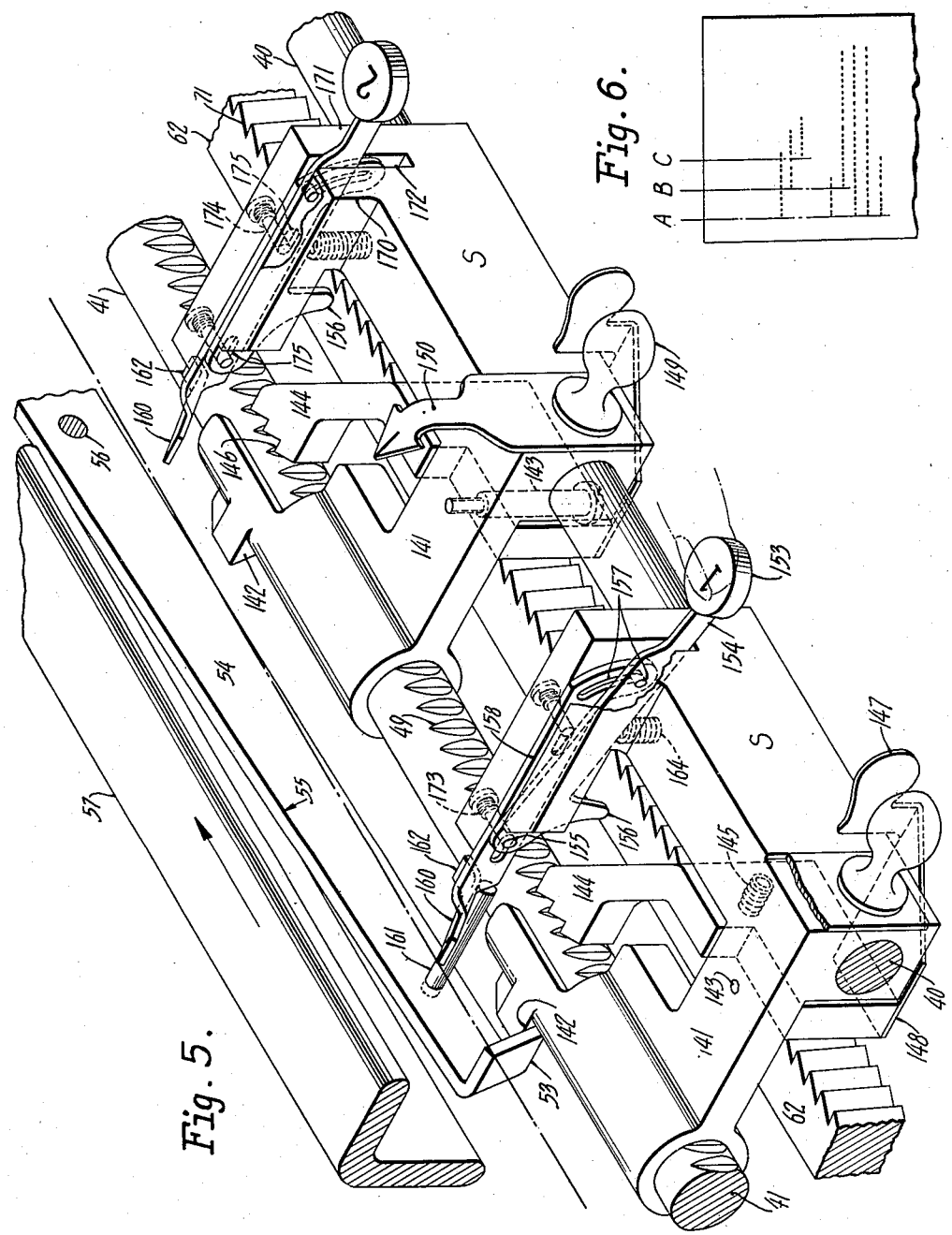

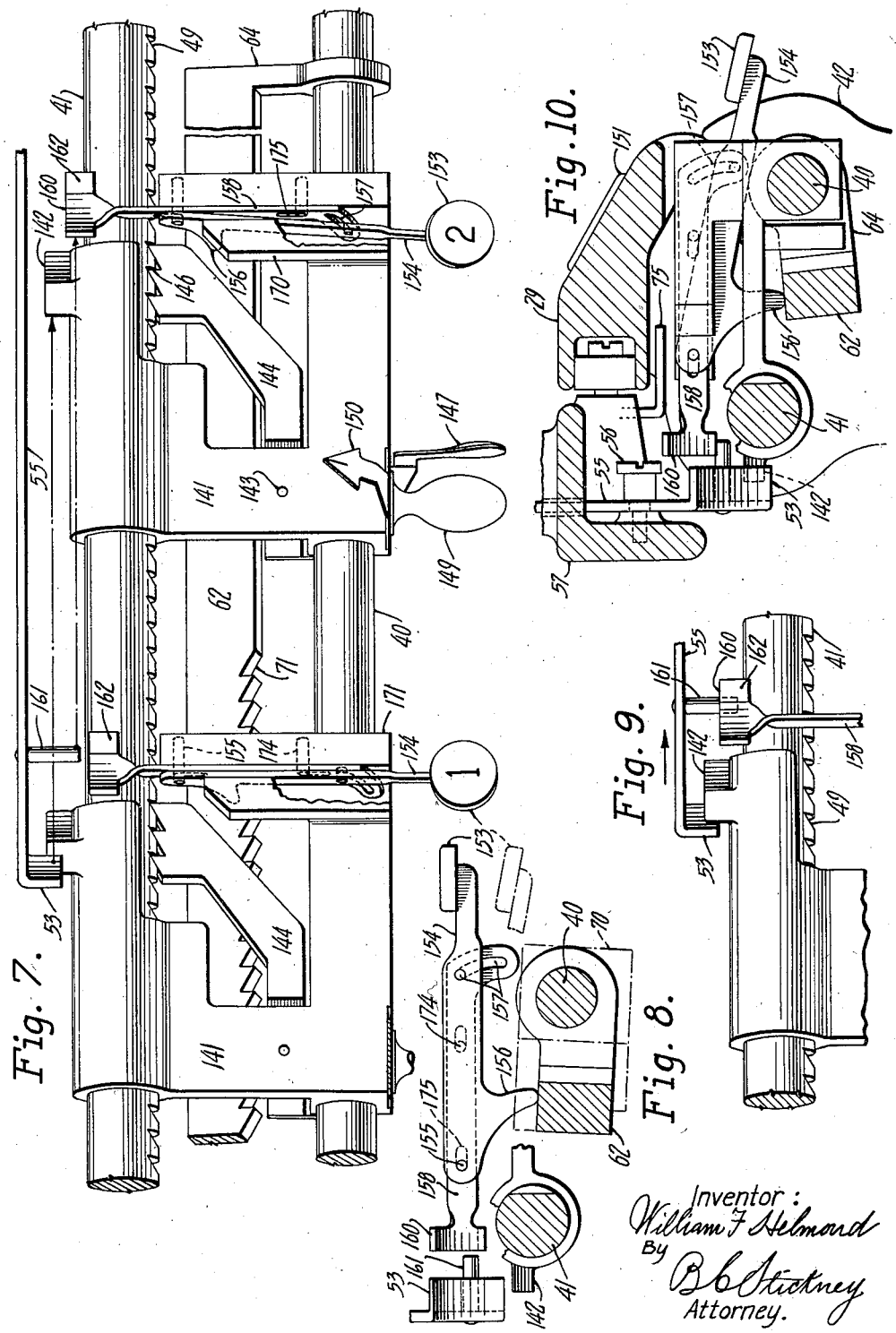

Inventor:
William F Helmond
By O. B. Stickney
Attorney.

May 30, 1939.  W. F. HELMOND  2,160,251
TYPEWRITING MACHINE
Filed March 17, 1937  6 Sheets-Sheet 6
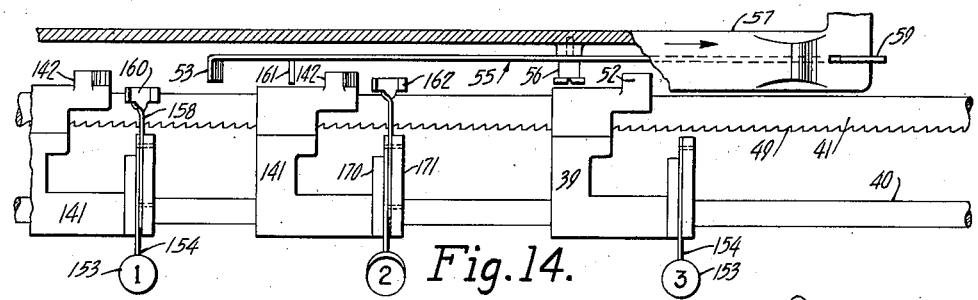
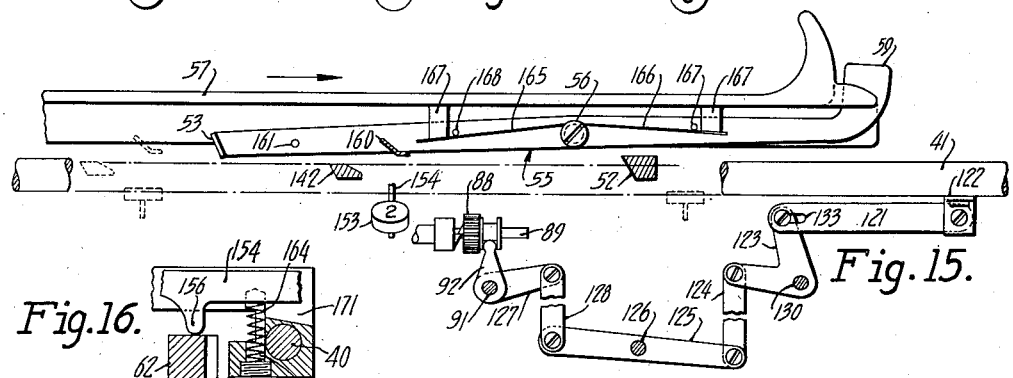
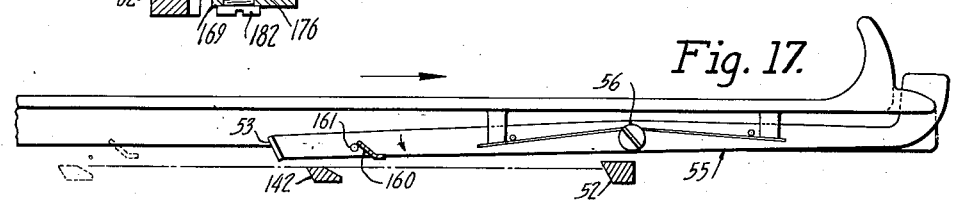
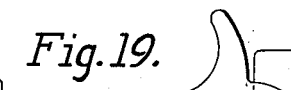
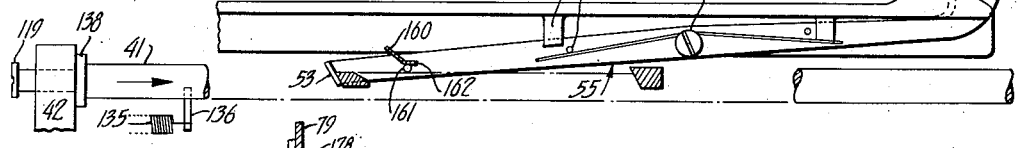
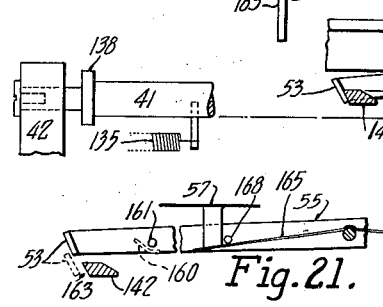
Inventor:
William F. Helmond
By B. C. Stickney
Attorney.

Patented May 30, 1939

2,160,251

UNITED STATES PATENT OFFICE 2,160,251

TYPEWRITING MACHINE

William F. Helmond, West Hartford, Conn., assignor to Underwood Elliott Fisher Company, New York, N. Y., a corporation of Delaware Application March 17, 1937, Serial No. 131,298

21 Claims. (Cl. 197—63)

This invention relates to mechanism for effecting and differentially gaging the return of a laterally reciprocal typing-machine carriage to one or another of a plurality of predetermined typing-line-start positions. Thus, in contradistinction to the ordinary practice of returning the carriage fully to line-start position at the extreme of a given range of travel and then advancing it, as by means of a tabulator, to one or another desired intermediate line-starting position, the invention deals with means, including a carriage-return motor, for returning the carriage to different extents and thereby determining said different line-starting positions.

An object of the invention is to provide a mechanism that is efficient and durable, and that is, moreover, simple and inexpensive so as to be readily applicable to existing forms of machines, such as the Underwood typewriter and its carriage-return mechanism exemplified in Patent 1,679,741 to H. L. Pitman, dated August 7, 1928.

A further object of the invention is to have said simple mechanism include a plurality of keys for selecting the different line-start positions, each key being operable to bring the carriage-return motor into play and to control stop means to arrest the resulting carriage-return consonantly with the corresponding line-start position.

A plurality of margin-stop units is employed for differentially gaging the carriage-return, each margin-stop unit being laterally adjustable individually to variably predetermine the line-start position of the carriage controlled thereby.

A feature of the invention resides in incorporating a key in each margin-stop unit that serves for an intermediate line-stop position and also incorporating in said unit means whereby a carriage-return limiting stop included in said unit co-operates with a counterstop only upon operation of said key so that, normally, the carriage is free to pass said margin-stop unit.

A further feature of the invention resides in the provision whereby any key, laterally adjustable along with its unit for different line-stop defining positions, is effective to start the carriage-return motor at any position of adjustment of the unit.

In a typewriter such as the Underwood, having the usual pair of laterally adjustable line-start and line-end defining margin-stops, there may be provided for each desired intermediate line-start position one of said margin-stop units having the key and the stop-controlling means co-operative with said key. Each intermediate line-start margin unit may be supported by and may be adjustable along the same rack or support means that serves for said usual pair of margin-stops. A universal member or the like operable to bring the carriage-return motor into play may have operative connection with each of said intermediate margin-stop units so that operation of the key incorporated in the margin-stop unit will cause the carriage-return motor to return the carriage. Each carriage-return limiting margin-stop unit may also have operative connection with a universal member or the like operable to disengage the carriage from the carriage-return motor consonantly with the line-start position defined by said unit. Thus, simplicity of structure is attained in that substantially it is only necesary to provide one of said margin-stop units, including the key and the stop means controlled thereby, for each desired intermediate line-start position, and in that each such unit is mounted upon substantially the same supporting structure that serves for the regular margin-stops. The motor-disengaging universal member may also be the member that co-operates with the carriage-return limiting margin-stop of said usual pair of Underwood or similar margin-stops.

Other features and advantages will hereinafter appear.

In the accompanying drawings,

Figure 1 is a cross-sectional side view of a typing machine showing the margin-stop devices and connections to the power-operable carriage-return mechanism.

Figure 2 is a perspective of a line-spacer co-operable with the carriage-return mechanism.

Figure 3 is a perspective including a plurality of the novel carriage-return limiting margin-stops and the connections to the carriage-return mechanism.

Figure 4 is a diagram of a bookkeeping sheet in which different lines of entries start severally at different item columns to illustrate one form of work for which the invention is useful.

Figure 5 is a perspective showing on an enlarged scale two of the intermediate margin-stops and illustrating the use of the first margin-stop from the left to determine arrest of the carriage-return.

Figure 6 is an other work-sheet diagram having lines indented or starting at different positions, as, for example, in a letter form.

Figure 7 is a top view perspective showing two of the intermediate margin-stops and showing the counter-stop passing the first margin-stop to co-operate with the second margin-stop that has been selected by means of its key.

Figure 8 is a side view diagram showing the normal relative positions of the margin-stop lug, counter-stop, key, carriage-return starting universal member, and a part co-operative with said key to bring said stop lug and counter-stop into co-operative relation.

Figure 9 is a top view perspective showing the counter-stop engaging the margin-stop lug under control of the key-operated part.

Figure 10 is a cross-sectional side view of the machine portion that encloses the margin-stops and supporting racks, front carriage guide-rail, the counterstop-carrying carriage member, and the carriage-return starting universal member, as operated by the margin-stop key.

Figure 14 is a top plan view of three line-start defining margin-stops and depicts selection of the middle margin-stop by means of its key for limiting the carriage-return run.

Figure 15 is a front elevation of the Figure 13 parts and diagrammatically includes the carriage-return clutch-mechanism operated by means of the selected middle margin-stop key to close said clutch.

Figure 16 is a partly sectioned side view showing details relating to a spring for the key on the margin-stop.

Figures 17, 18 and 19 are front view diagrams showing, respectively, a first, intermediate, and final phase of bringing the counter-stop and margin-stop lug into operative relation, consequent to operation of the key associated with said margin-stop lug.

Figure 20 is a front view diagram showing the relative positions of the Figure 15 parts, when the universal member is displaced to open the carriage-return clutch as the carriage encounters the selected margin-stop unit.

Figure 21 is a front view diagram illustrating the disengagement of the counter-stop from the margin-stop at the end of a carriage-return run.

Figure 22 is a fragmentary view showing details of a connection in the carriage-return initiating train.

Figure 11:
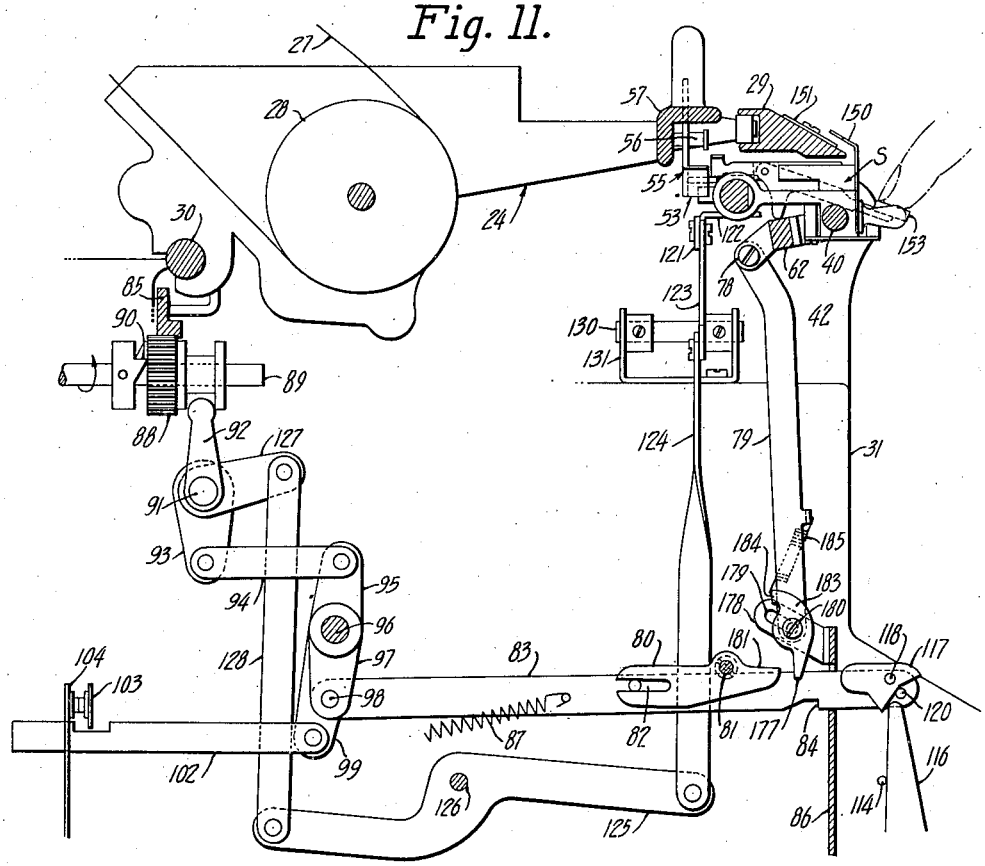
Figure 11 is a cross-sectional side view showing the margin-stop key operated and the resulting carriage-returning condition of the carriage-return mechanism.

Type-keys 25 and type-bars 26, Figure 1, are operatively connected as in the Underwood typewriter, by the usual means, not shown, for typing on a work-sheet 27 on a revoluble platen 28 in a carriage 24 laterally reciprocal along front and rear guide-rails 29, 30 in frame 31 of the machine. Spring motor 33, Figure 3, and carriage-feed rack 34, escapement-wheel 35, and escapement-dogs 36 co-operate during the typing of the line to advance the carriage leftward.

Leftward carriage movement is limited by a laterally adjustable margin-stop 38, Figure 3; and rightward or return carriage movement is limited by a margin-stop 39. Said margin-stops 38 and 39, insofar as they determine the two extremes of a variable maximum range of carriage travel, correspond with the pair of margin-stops usually provided in the typewriter.

Front and rear cross-rods 40, 41, for supporting the margin-stops, are supported at their ends in standards 42 shown disposed, Figure 3, as for a wide-carriage machine, on laterally projecting arms 43 of the frame 31.

The margin-stop 39, at the right, includes a body 45 slidably fitting both cross-rods 40, 41. A lock or pawl lever 46 is pivoted to said body 45 and is spring-pressed so as to normally interlock, as at 48, Figure 3, with teeth 49 provided on the rear cross-rod 41. For releasing the margin-stop 39 for lateral adjustment, the lock-lever 46 is retractable by means of a finger-piece 51. A lug 52 on the body 45 is for intercepting a counter-stop 53 on the carriage to limit the rightward or return movement of the latter.

Figure 12:
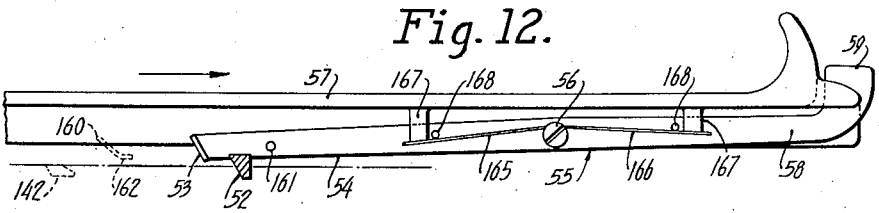
Figure 12 is a front view diagram showing the counter-stop normally effective to engage the stop lug provided on the last one of two or more line-start defining margin-stops.
Figure 13:
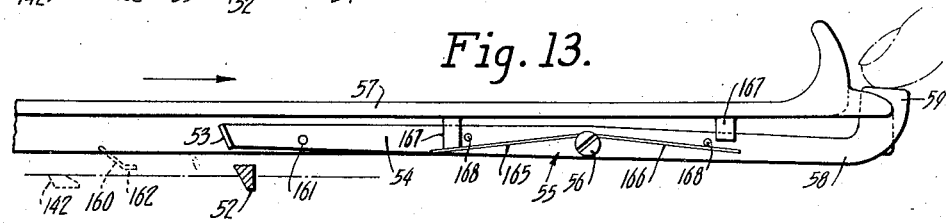
Figure 13 is a front view showing, as distinguished from Figure 12, the counter-stop displaced manually to permit the carriage to be moved in return direction beyond said last margin-stop.

Said counter-stop 53 is at the end of an arm 54 of a lever 55 pivoted on a stud 56 projecting forwardly from a front cross-member 57 of the carriage. An arm 58 of said counter-stop-lever 55 has a finger-piece 59 for rocking said lever 55 from the Figure 12 normal position, in which the counter-stop 53 is in operative alignment with the margin-stop lug 52, to the Figure 13 position, in which said counter-stop 53 is raised above said lug 52 to permit the carriage to be moved rightward beyond the limit defined by said margin-stop lug 52. Means normally keeping the counter-stop-lever 55 in the Figure 12 position will be referred to later.

The margin-stop 38 at the left, Figure 3, is shown supported independently of the rear cross-rod 41 in that it has a body 61 supported by and slidable along the front cross-rod 40 and a cross-bar 62. Said cross-bar 62, in order to be depressible for a purpose which will appear presently, has end arms 64 fulcrumed, Figure 3, on the front cross-rod 40. A torsion spring 66 engages the standard 42 and a pin 68 in the normal elevated position determined by means described later. Said pin 68 abuts the inner side of the standard 42, and a collar 69 on the front cross-rod 40 abuts the cross-bar arm 64 to hold the cross-bar 62 stationary laterally. Headed screws 77 threaded in the ends of the front cross-rod 40 and bearing against the outer sides of the standards 42 hold said cross-rod 40 stationary endwise. Said cross-bar 62 has rack-teeth 71 co-operative with a spring-pressed lock-lever or pawl 72 pivoted to the body 61 of said left margin-stop 38 to locate and hold the latter laterally. For releasing said left margin-stop 38 for lateral adjustment, said lock-lever 72 is retractable from the cross-bar 62 by means of a finger-piece 73. A lug 74 on the margin-stop body 61 of the left margin-stop 38 is for intercepting a counter-stop 75, projecting forwardly from the carriage cross-member 57, to limit the leftward movement of the carriage.

Said counter-stop 75 may also act as a tappet for engaging a cam 76 on the left margin-stop 38 to rock the latter downwardly about the front cross-rod 40 and thereby depress the cross-bar 62 for automatically initiating a power-driven carriage-return movement as the carriage 24 takes the last letter-feed step to a predetermined end of a line of typing. The body 61 of the left margin-stop 38 embraces the cross-bar 62 as at 70 in Figure 8 which indicates said body in dot-and-dash outline.

Referring to the carriage-return mechanism, Figures 1, 3 and 11, the cross-bar 62 has pivoted thereto at 78 a depending thrust rod 79. The depression of said cross-bar 62 depresses said rod 79 to rock a lever 80, pivoted to main frame 31 at 81, so that said lever 80, by means of a pin-and-slot connection 82, lifts a carriage-return trip-link 83 to disengage a latch shoulder 84 of the latter from a holding-plate 86. The resulting rearward movement of the lifted trip-link 83 by spring 87 to the Figure 11 position acts, through an intermediate train, to slide a carriage-return pinion 88, meshing with rack 85 on the carriage, rearwardly along a pinion-shaft 89 to be clutched to the latter as at 90, Figure 11. Said pinion 88 and shaft 89 are normally operatively disconnected as at Figure 1 which also shows the normal positions of the cross-bar 62 and the trip-link 83. Said intermediate train includes a rock-shaft 91 having a pinion shifter 92 and connected by arm 93, link 94, and arm 95 to a rock-shaft 96 having an arm 97 pivotally connected at 98 to the rear end of said trip-link 83. The rock-shaft 96 also has an arm 99 from which extends rearwardly a control link 102 that, Figures 1 and 3, normally holds a spring-pressed contact 103 disengaged from a companion contact 104 so that an electric carriage-return motor 105, Figure 3, is normally at rest, said contacts forming a motor switch. At the rearward movement of said trip-link 83 to the Figure 11 position the control link 102 also moves rearwardly to permit said contacts 103, 104 to close to start the motor. A motor-shaft 106 drives the power-shaft 89 through a worm and gear connection 107, Figures 1 and 3. One lead 108 from a power plug 109, Figure 3, is directly connected to the motor 105 and the switch contacts 103, 104 are in the other lead 110 to open and close the motor circuit.

The motor 105 may be attached to the back of the frame 31 which also supports a fitting 111 in which the pinion and motor shafts 89, 106, are journaled. A casing 101 for the switch 103, 104 is attached to frame 31 and slidably supports the rear end of the switch-control link 102. The rock-shafts 91, 96, are also journaled in the framework of the machine.

A carriage-return key-lever 112, pivoted at 113 to the machine frame 31 so as to be adjacent to the key-board, is held normally against a stop 114 by spring 115 and is manually rockable to a stop 129 to swing its arm 116 forwardly to engage a pawl 117 on the trip-link 83 and thereby lift and release the latter from the plate 86 to start the carriage-return operation. Said pawl 117, pivoted at 118, is weighted to normally bear against a stop 120 and is swingable from said stop 120 to permit the carriage-return key arm 116 and said pawl 117 to idly by-pass one another at the restoration of the parts.

The carriage-return key-lever 112, the trip-link 83 and its pawl 117, and the described mechanism operative at release of said trip-link to cause the carriage-return pinion 88 and rack 85 to co-operate to return the carriage are substantially as shown in the aforesaid Pitman Patent 1,679,741.

Mechanism for ending the carriage-return run at a place determined by the margin-stop 39 is herein illustrated as being along the lines disclosed in the application, Serial No. 57,205, of Henry L. Pitman, filed January 2, 1936. In said mechanism, when the counter-stop 53 on the returning carriage encounters the stop lug 52 of the margin-stop 39, the latter is driven rightward so as to also move the cross-rod 41 endwise to the right; said cross-rod being slidably retained in the standards 42, and its rightward movement being limited by means of a stop screw 119 meeting the outer face of the left standard 42. By means of an arm 121, attached to the rear cross-rod 41 by bracket 122, the rightward endwise movement of said cross-rod 41 rocks a bell-crank 123 clockwise of Figure 3, to lift a link 124, rock a lever 125, fulcrumed at 126 in the frame 31, and pull down a link 128 connected to arm 127 of the shaft 91 to rock the latter clockwise of Figure 11, to unclutch the carriage-return pinion 88 by shifting it forwardly along the pinion-shaft 89 to the normal Figure 1 position. The clockwise rocking of said shaft 91 also rocks the shaft 96 anticlockwise to restore the trip-link 83 for re-engagement by its latch shoulder 84 with the plate 86 and to also restore the switch-control link 102 to open the switch contacts 103, 104 for stopping the motor 105. The bell-crank 123 is on a rod 130 journaled in bracket 131 on the frame 31. A pin-and-slot connection 133 in the described train from the rear cross-rod 41 to the carriage-return pinion 88 permits the latter to move rearwardly to the Figure 11 position independently of said cross-rod 41 when the latter is in its normal, that is, leftwardly retracted, position. A spring 135 attached to a pin 136 in the rear cross-rod 41 and also to a pin 137 in the standard 42 retracts and normally keeps said rear cross-rod 41 in leftward position determined by a collar 138 of the cross-rod abutting the inner face of the standard 42. A depending fork 140 of the cross-rod 41 keeps the latter from turning by embracing the pin 137. It will be understood that immediately following the arrest of the rightward return of the carriage through disengagement of the carriage-return pinion 88 effected by means of the cross-rod 41, the carriage has the usual drop-back movement of approximately one to one and one-half letter-spaces, due to the usual backlash in the escapement devices 35, 36, and that this drop-back movement of the carriage permits the leftward retraction of the rear cross-rod 41, and right margin-stop 39, by the spring 135.

Figure 4 shows a bookkeeping sheet having lines of typing starting at one or another of the several columns shown. Figure 6 shows another work-sheet form, as for example, a letter having lines starting at different positions A, B and C. In either case the line-start furthermost to the left on the work-sheet may be determined by returning the carriage to the margin-stop 39.

For each desired intermediate line-start definition such as B or C, Figure 6, or the second or third column line-start depicted in Figure 4, there may be provided an intermediate margin-stop unit S to the left of the margin-stop 39.

Each unit S includes a body 141 slidably supported by the cross-rods 40, 41 and laterally adjustable therealong. A stop-lug 142 on the body 141 is below, see Figures 8 and 15, the normal path of the counter-stop 53 on the carriage so that normally the return movement of the latter is limited by the lug 52 on the margin-stop 39. A headed pivot 143, Figure 5, depending from the body 141 fulcrums a lock-lever or pawl 144 normally pressed by spring 145 to engage the teeth 49 of the rear cross-rod 41 as at 146 to locate and hold the unit S laterally. For releasing the unit S for lateral adjustment the lock-pawl 144 may be retracted by means of a finger-piece 147 shown attached to said pawl 144 as at 148. Each margin-stop unit S has a shift-handle 149, and also has a pointer 150 to indicate the position of the unit S with reference to a letter-space or column scale 151, mounted on the carriage-rail 30. The shift handle and pointer are also provided on each margin-stop 38, 39. It may be noted that the lock-pawls 46, 72 of said margin-stops 38, 39 are fulcrumed and spring-pressed similarly to the pawl 144.

Each unit S also includes a key 153 depressible for initiating a carriage-return run, and for determining cooperation of the carriage counter-stop 53 and stop-lug 142, to limit said return run for the intermediate line start for which said unit S is set.

A lever 154 mounts said key 153, and is fulcrumed on a stud 155 in the unit S so that at depression of said key and lever a nose 156 of said lever depresses the universal member or crossbar 62 to initiate the carriage-return run by releasing the trip link 83 to cause the carriage-return pinion 88 to be clutched, Figure 11, to the shaft 89 and the switch contacts 103, 104 to be closed to start the motor 105. By means of a pin-and-cam-slot connection 157 between the key-lever 154 and an adjacent slide 158, that is also provided in each unit S, and is guided for fore and aft movement therein as will be explained presently, the depression of said key-lever 154 moves said slide 158 rearwardly (leftward of Figure 8) to interpose, simultaneously with the initiation of the carriage-return run, a cam-end 160 of said slide into the path of a stud 161 provided on the arm 54 of the counter-stop lever 55 on the carriage. Said cam-end 160 remains thus interposed, as by keeping the key-lever 154 depressed, in order to be ready to engage said stud 161 at the approach of the latter with the returning carriage, to thereby cause said counter-stop lever 55 to be cammed and thereby turned counterclockwise from the Figure 17 position for interception of the counter-stop 53 by the stop-lug 142 of said unit S as depicted in Figures 9 and 19. Figure 18 represents the counter-stop lever 55 in process of being turned thus by means of the return movement of the carriage. A dwell 162 of said cam end 160 becomes positioned, Figure 19, over said stud 161 by the time the counter-stop 53 contacts the stop-lug 142.

The counter-stop 53 having become thus engaged with the stop-lug 142 as in Figure 19, the still returning carriage drives the margin-stop unit S and the universal member or rear cross-rod 41, interlocked therewith by means of the pawl 144, rightward to the Figure 20 position. This effects, like in the manner hereinbefore described, operative disconnection of the carriage-return pinion 88 from the shaft 89, restoration of the trip-link 83, and opening of the switch-contacts 103, 104 for stopping the motor. At the ensuing drop-back step of the carriage due to the aforementioned escapement-mechanism backlash, the carriage settles at the line-start position designated by said margin-stop unit S. Said drop-back movement of the carriage permits immediate leftward restoration of the cross-rod 41 and the unit S by the cross-rod spring 135. Preferably, the extent of carriage-drop-back is slightly in excess of the leftward restoration movement of the margin-stop unit S and the cross-rod 41 as determined by the cross-rod stop-collar 138. This excess frees the counter-stop 53 and its lever 55 from the margin-stop lug 142 as is indicated by clearance 153, Figure 21.

The counter-stop 53 having become engaged with the stop-lug 142 of the margin-stop unit S and the carriage having been returned, the depressed key-lever 154 is released, and thereupon becomes restored immediately by a compression spring 164 disposed, Figure 5, between said key-lever 154 and the margin-stop body 141. By means of the pin-and-cam-slot connection 157, the restoration of said key-lever 154 causes the slide 158 and its cam-end 160 to be retracted (forwardly) from the stud 161 of the counter-stop lever 55. The latter, freed from the margin-stop lug 142, as indicated by the clearance 163, Figure 21, and from said cam-end 160, is turned, clockwise, back to the normal position, Figures 3, 12, 15 and 21, by a spring 165. Said spring 165 and another counter-stop-lever-spring 166 are normally stopped, Figure 15, against two stops 167 provided on the carriage-frame member 57. The opposite counter-stop-lever arms 54, 58, to the right and left of the counter-stop-lever-pivot stud 56, are normally stopped by said springs 165, 166, as by means of spring-engaging pins 168 to poise the counter-stop lever 55 in said normal position. Said springs 165, 166 are shown, Figure 3, as being parts of one spring strip or wire sprung upwardly at its middle by said pivot-stud 56. The spring 166 also is operative to restore the manually operated counter-stop lever 55 from the Figure 13 position, in which as hereinbefore explained the counter-stop 53 clears the stop lug 52, to the normal position, Figure 12.

The body 141 of each unit S has portions 170, 171, laterally separated by a slot 172, Figure 5, to form side guides for the key-lever 154 and the slide 158. The key-lever-pivot stud 155 is removably threaded as at 173 into the portion 171, and co-operates with a similar stud 174, and slots 175 in the slide 158 to guide the latter for its fore-and-aft movements. Said stud 174 is shortened in that its slide-slot-engaging end clears the key-lever 154. The body 141 also includes below said portions 170, 171, a boss 169, Figure 16, having a hole 176 to receive the key-lever spring 164 and a spring supporting plug 182.

The key-lever 154, and the cross-bar 62 and its depressed thrust-rod 79 that co-operate with the lever 80 to release the trip-link 83, may remain depressed while the carriage moves the margin-stop unit S and the cross-rod 41 rightwardly and effects the restoration of said trip-link 83 and its lever 80 to the Figure 1 positions. To permit restoration of said trip-link 83 while said thrust-rod 79 remains thus depressed, the latter is caused during its initial depression to move forwardly as well as downwardly at its lower end 177, and thereby become moved away from the trip-link lever 80, after having rocked the latter, as is indicated in Figure 11 and also by the dotted outline in said lower end 177 in Figure 1. This is accomplished by a guide 178 on the plate 86, having a downwardly and forwardly oblique guide-slot 179 engaging a stud connection 180, Figure 22, near said lower end of said thrust-rod 79.

The trip-link 83 and its lever 80 having been restored while said lower end 177 remains depressed and positioned forwardly of a nose 181 of said lever 80, said nose will be in the way of restoration of said thrust-rod 79 to the Figure 1 position upon release of the key-lever 154. For this reason, said lower end 177 is on a by-pass or yieldable pawl 183, pivoted on said thrust-rod 79 by means of the stud connection 180. Said pawl 183, pressed by a spring 185, normally stops against said thrust-rod 79, as at 184. During restoration of the thrust-rod 79 the spring 185 yields to permit the pawl to turn counterclockwise in order that the end 177 may pass the lever-nose 181, the spring 185 then restoring said pawl relatively to the thrust-rod 79.

The margin-stop 39 at the extreme right, Figures 3 and 14, may also be provided with a key and key-lever 153, 154, for depressing the cross-bar 62 for initiating a carriage-return run; said key being usable instead of the carriage-return key-lever 112 at the key-board. Since the stop-lug 52 of said margin-stop 39 and the counter-stop 53 on the carriage are normally in operative alignment, as shown in Figure 15, said key 153 on the margin-stop 39 need not control the counter-stop lever 55, and therefore inclusion of a slide such as 158 in said margin-stop 39 is not shown, see Figures 3 and 14.

Operation of the automatic carriage-return initiating control by means of the cam 76 on the margin-stop 38 at the left of Figure 3 may be silenced at will preparatory to use of differential returns of the carriage by means of the keys 153. Said cam 76 is therefore on an arm 187, swingable by means of a finger-piece 188 about a stud 189 on the margin-stop 38. Figure 3 represents in full line the position of the cam 76 in its effective position, and in dot-and-dash outline the position in which it is retracted from the path of the tappet 75 on the carriage, suitable provision being made to detent the cam 76 and its arm 187 in either position, as, for example, by means of a friction fit between said arm 187 and the stud 189.

The keys 153 may have distinguishing characters such as the numerals 1, 2, 3, Figure 3.

Figure 5 shows two of the novel intermediate margin-stop units S and shows the one at the left as being in play, by depression of its key 153, for returning the carriage for the particular line-start position for which said unit is set. Figure 7 illustrates the margin-stop unit S at the right as being in play, through depression of its key, to limit the carriage-return; and further illustrates the other margin-stop unit S, to the left, as having its stop-lug 142 idly by-passed by the carriage counter-stop 53, since the key, symbolized by 1, of said other unit was not depressed and therefore the associated cam-end at 160 was not projected rearwardly to bring said counter-stop 53 into engagement with said stop-lug 142. Figure 14 represents two of the intermediate margin-stops S and the margin-stop 39, and shows the key 153 of the middle one of said three margin-stops, depressed for initiating and limiting the carriage-return run.

If none of the intermediate margin-stops S is brought into play by its key 153 the carriage is free to be returned to the margin-stop 39, as upon operating the key 153 of the latter or the carriage-return key-lever 112 at the keyboard for automatic power return, or by manually returning the carriage.

Figure 2 represents a suitable line-space mechanism, for the platen, such as that described in the aforesaid Pitman patent, such mechanism being operable manually, and also being operable automatically in conjunction with the power carriage return. In said Pitman mechanism the carriage-rack 85 has an initial limited endwise movement relative to the carriage, when said rack is driven rightward by the carriage-return pinion 88; and said rack is operatively connected to the line-space pawl 195 so that its said idle movement effects the line spacing.

It will be seen now that there may be provided as many of the intermediate margin-stop units S as may be needed, for determining one or another of a given number of different intermediate line-start positions of the carriage. It will be further seen that, severally, said units S may be adjusted and located laterally to variably predetermine each of the selectable line-stop positions of the carriage as, for example, to variably predetermine them in accordance with different forms of work-sheets. It will be seen further that the key 153 of each unit S is operative at any location of the latter to initiate the power-driven carriage-return operation and to determine co-operation of its stop-lug 142 with the counter-stop 53 on the carriage. It will also be seen that the arrangement, whereby each key is thus operative, is simple, and that the invention is easily applicable to existing forms of machines.

It will also be seen that by reason of the provision for shifting the counter-stop 53 itself into and out of operative alignment with the stop-lugs 142, the latter may be made integral with the bodies 141 of the margin-stop units S, so as to form solid and durable abutments for limiting the differential carriage-returns.

Variations may be resorted to within the scope of the invention, and portions of the improvements may be used without others.

Having thus described my invention, I claim:

1. In a typewriting machine, the combination of a laterally reciprocable carriage, a plurality of substantially individual units, each forming a line start-defining margin-stop, a counter-stop to co-operate with one or another of said margin-stops for arresting the carriage-return at a corresponding line-start position, said margin-stop units and counter-stop being normally out of operative alignment, each margin-stop unit also including a key manually operable and having connections for determining alignment of said margin-stop and counter-stop in consequence of operation of said key, and power-operated carriage-return mechanism responsive to operation of the key of any one of said margin-stops to return the carriage to said margin-stop, said margin-stop units, together with their keys, being adapted to be laterally adjustable individually for different line-start positions, and the carriage-return mechanism being adapted to be responsive to operation of said keys at all positions of adjustment of the margin-stop units.

2. In a typewriting machine, the combination of a laterally reciprocable carriage, a plurality of substantially individual units forming margin-stops, each margin-stop unit including a key, the keys being selectively operable manually at will for selectively determining co-operation of the margin-stops for returning the carriage to a plurality of different line-start positions, each margin-stop unit and its key being laterally adjustable to vary its line-start-defining position, a carriage-return motor, and means responsive to operation of any one of said keys of said units for causing said motor to return the carriage to the margin-stop associated with the operated key.

3. In a typewriting machine having a frame, the combination of a carriage reciprocable on said frame, a laterally adjustable carriage-return-limiting margin-stop on the frame, a counter-stop on the carriage normally out of operative alignment with said margin-stop and movable into said operative alignment, a manually operable key connected to said margin stop so as to be laterally adjustable therewith, power-operable carriage-return mechanism operative in response to an operation of said key, means controlled by said key to cause the carriage-return movement to move said counter-stop into said operative alignment to limit said return, and means acting to cause said counter-stop to move out of said operative alignment again automatically and consonantly with the end of said return.

4. In a machine constructed according to claim 3, inclusive of another margin-stop for limiting a carriage-return movement extending beyond said first mentioned margin-stop, the counter-stop being normally in operative alignment with said other margin-stop.

5. In a machine constructed according to claim 3, inclusive of another margin-stop for limiting a carriage-return movement extending beyond said first margin-stop, spring means poising said counter-stop normally in operative alignment with said other margin-stop, said spring means being yieldable to permit movement of said counter-stop in opposite directions, either to bring said counter-stop out of operative alignment with said other margin-stop for permitting the carriage to move in return direction beyond said other margin-stop, or in the opposite direction for alignment with the first margin-stop.

6. In a typewriting machine, the combination of a carriage advanceable from and returnable to a certain line-start position, a laterally adjustable stop and a counter-stop for limiting return of the carriage to a variable intermediate line-start position, said stops being normally out of operative alignment to normally permit said carriage to return to said first mentioned line-start position, a manually operable key connected to and adjustable with the adjustable stop, means controlled by said key for determining operative alignment of said stops, and a power operable carriage-return mechanism, responsive to operation of said key to return said carriage to the intermediate line-start position defined by said stops.

7. In a typewriting machine, the combination of a carriage advanceable from and returnable to a certain line-start position, a laterally adjustable stop and a counter-stop for limiting return of the carriage to a variable intermediate line-start position, said stops being normally out of operative alignment to normally permit said carriage to return to said first mentioned line-start position, a manually operable key on the adjustable stop and adapted for determining operative alignment of said stops, a power operable carriage-return mechanism, responsive to operation of said key to return said carriage to the intermediate line-start position defined by said stops, and another key to which said carriage-return mechanism is responsive, said other key being operable independently of said first key for returning the carriage to said first-mentioned line-start position.

8. In a typing machine, the combination with a laterally reciprocable carriage, a margin-stop having a carriage-return limiting abutment and laterally adjustable to different carriage arresting stations, a counter-stop normally out of operative alignment with said abutment but movable into operable alignment therewith, a carriage-return motor, a manually operable carriage-return key connected to said margin-stop so as to be laterally adjustable therewith, means responsive to operation of said key to cause said motor to return said carriage, and means rendered operative by said key for causing the returning carriage to move said counter-stop into operative alignment with said margin-stop abutment in time for terminating the carriage-return run.

9. In a typing machine, the combination with a laterally reciprocable carriage, a margin-stop having a carriage-return limiting abutment and laterally adjustable to different carriage arresting stations, a counter-stop normally out of operative alignment with said abutment but movable into operative alignment therewith, a normally idle carriage-return motor, a manually operable carriage-return key connected to said margin-stop so as to be laterally adjustable therewith, means responsive to operation of said key to cause said motor to return said carriage, means rendered operative by said key for causing the returning carriage to move said counter-stop into operative alignment with said margin-stop abutment in time for terminating the carriage-return run, and means automatically operative to cause the motor to be idle again at and for the termination of the carriage-return run.

10. In mechanism for returning a laterally reciprocable typewriting-machine carriage to different line-start positions, the combination with said carriage and a normally idle carriage-return motor, of a plurality of carriage-return-limiting margin-stops, one margin-stop being for an extreme line-start position of the carriage, and another margin-stop being for an intermediate line-start position of the carriage, a rack-structure on which said margin-stops are mounted so as to be individually settable therealong to different line-start-defining stations, a counter-stop co-operative with said margin-stops, said counter-stop and intermediate line-start margin-stop being normally out of operative alignment, a manually operable key incorporated in said intermediate line-start margin-stop and settable therewith to said different stations, means operable by said key at any line-start-defining station of the intermediate margin-stop to cause said motor to return said carriage, and means responsive to said operation of said key to determine operative alignment of said intermediate margin-stop and counter-stop for terminating the carriage-return run for the intermediate line-start position.

11. In mechanism for returning a laterally reciprocable typewriting-machine carriage to different line-start positions, the combination with said carriage and a normally idle carriage-return motor, of a plurality of individual units, each forming a carriage-return limiting margin-stop, said margin-stop units being along the range of carriage travel, each margin-stop unit including a manually operable key, a universal device operable by any one of the keys, means responsive to operation of said universal device to cause said motor to return said carriage, and counter-stop means effective to cooperate with any margin-stop, upon operation of its key, to limit the return of the carriage, said margin-stop units being individually settable to different line-start defining stations along said range of carriage travel, and each key being connected to its margin-stop so as to be settable therewith, said universal device being operable by any key at any station of its margin-stop unit.

12. In means for returning a typing-machine carriage to line-starting position and also beyond said position, the combination with a line start defining margin-stop having a carriage-stop abutment and laterally adjustable to different line-start positions, of a counter-stop normally out of operative alignment with said abutment to permit the carriage to return beyond said position, said counter-stop being movable into operative alignment with said abutment, a manually operable key connected to said margin-stop so as to be laterally adjustable therewith, carriage-returning means, including a motor, responsive to operation of said key to return said carriage by power, a device connected to said margin-stop so as to be laterally adjustable therewith and rendered effective by said operation of said key, for controlling said counter-stop as the carriage is returned so as to cause the carriage-return movement to move said counter-stop into operative alignment with said abutment of the margin-stop, said counter-stop thereby ultimately co-operating with the returning carriage to displace said margin-stop, and means responsive to said displacement of said margin-stop to silence said carriage-returning means for terminating the carriage-return movement.

13. In means for gaging the return of the carriage of a typing-machine to an intermediate line-start position, said machine having a line-end margin-stop and also having a line-start or carriage-return-limiting margin-stop beyond said intermediate line-start position of the carriage, the combination with a universal member along which said line-end margin-stop is settable, said universal member being displaceable by said carriage by means of said line-end margin-stop as the carriage reaches the line-end, and means, including a motor, responsive to said displacement of said universal member to return the carriage by power, of an intermediate carriage-return-limiting margin-stop for said intermediate line-start position, a carriage-return key on said intermediate margin-stop operatively connected to said universal member, whereby operation of said key returns said carriage, and counter-stop means co-operative with said carriage-return-limiting margin-stops, for terminating the carriage-return run, said counter-stop means arranged to co-operate with said first-mentioned carriage-return-limiting margin-stop depending on non-operation of said key as when the carriage-return is effected by means of the line-end margin-stop, or to co-operate with said intermediate carriage-return margin-stop depending on operation of said key.

14. In means for gaging the return of the carriage of a typing-machine to an intermediate line-start position, said machine having a line-end margin-stop and also having a line-start or carriage-return-limiting margin-stop beyond said intermediate line-start position of the carriage, the combination with a universal member along which said line-end margin-stop is settable, said universal member being displaceable by said carriage by means of said line-end margin-stop as the carriage reaches the line-end, and means, including a motor, responsive to said displacement of said universal member to return the carriage by power, of an intermediate carriage-return-limiting margin-stop for said intermediate line-start position, a carriage-return key on said intermediate margin-stop operatively connected to said universal member, whereby operation of said key returns said carriage, counter-stop means co-operative with said carriage-return-limiting margin stops, for terminating the carriage-return run, said counter-stop means arranged to co-operate with said first-mentioned carriage-return-limiting margin-stop depending on non-operation of said key as when the carriage-return is effected by means of the line-end margin-stop, or to co-operate with said intermediate carriage-return margin-stop depending on operation of said key, and means settable at will to render said line-end margin-stop ineffective for returning the carriage.

15. In mechanism for returning a typing-machine carriage, the combination with said carriage, of a margin-stop laterally adjustable to different stations, a manually operable key connected to said margin-stop so as to be laterally adjustable therewith, power-operated carriage-return mechanism, a device trippable to condition said carriage-return mechanism for resultant actuation, connections enabling the operation of said key to trip said device, and counter-stop means normally out of operative alignment with said margin-stop, and means depending on depression of said key for determining operative alignment of said counter-stop with said margin-stop to restore said carriage-return mechanism and its tripped device by means of a final small part of the carriage-return movement, said connections being arranged to clear said tripped device after the depression of said key, whereby said tripped device and carriage return mechanism may be restored while said key remains depressed for definitely determining said co-operation of said counter-stop means and margin-stop.

16. In a typewriting machine having a laterally reciprocable carriage, and power-operated carriage-return mechanism, the combination of a margin-stop settable to different carriage-return-limiting stations, a universal bar extending along the range of margin-stop stations and operable to bring the carriage-return mechanism into play, a manually operable carriage-return key on said margin-stop arranged to engage and operate said universal bar at any station of the margin-stop, and counter-stop means co-operative with said margin-stop under control of said key for limiting the carriage-return run, said counter-stop means being adapted to normally clear said margin-stop whereby said carriage is normally returnable beyond said margin-stop to an extreme line-start position.

17. In a typewriting machine having a laterally reciprocable carriage, and power-operated carriage-return mechanism, the combination of a margin-stop settable to different carriage-return-limiting stations, a universal bar extending along the range of margin-stop stations and operable to bring the carriage-return mechanism into play, a carriage-return key on said margin-stop arranged to engage and operate said universal bar at any station of the margin-stop, and means forming a counter-stop normally out of operative alignment with a stop-lug included in said margin-stop, said margin-stop including a camming device conditionable by operation of said carriage-return key for engaging said counter-stop means to bring the counter-stop into operative alignment with said margin-stop lug by means of the carriage-return movement.

18. The invention as set forth in claim 17 inclusive of spring means for restoring said camming device and carriage-return key upon release of the latter.

19. In a typing-machine, the combination with a laterally reciprocable carriage, of a plurality of carriage-return limiting margin-stops for gaging different line-start positions of the carriage, said margin-stops being individually settable to different line-start defining stations, a manually operable key included in each margin-stop, said key being shifted laterally along with the margin-stop in setting the latter to one or another of said stations, the several keys being selectively operable, and means responsive to the operation of any one of said keys to return the carriage by power to the line-start position corresponding with its margin-stop.

20. In a typewriting machine, the combination with a laterally reciprocable carriage, of a carriage-return-limiting margin-stop laterally adjustable to different line-start-defining stations, a manually operable key on said margin-stop and therefore movable laterally with the latter to said different stations, and power-operated carriage-return mechanism adapted to be controlled by said key, irrespective of the station of the margin-stop, for returning the carriage to said margin-stop.

21. In a typewriting machine, the combination of a laterally reciprocatory carriage, a plurality of margin stop units, means supporting said units severally at different carriage arresting stations, each unit being laterally adjustable to its station, a counter-stop common to but normally out of operative alignment with said units, a plurality of manually operable keys, one for each unit, each key being connected with its unit so as to be laterally adjustable therewith, a motor, means universally responsive to operation of any one of said keys to cause said motor to effect movement of said carriage in one direction, and means controlled by each key to determine operative alignment of the corresponding margin stop and said counter-stop for arresting said movement.

WILLIAM F. HELMOND.